United States Patent
Byrd (10) Patent No.: US 10,866,804 B2
(45) Date of Patent: Dec. 15, 2020

(54) RECOMMENDATIONS BASED ON THE IMPACT OF CODE CHANGES

(71) Applicant: ENTIT SOFTWARE LLC, Sanford, NC (US)

(72) Inventor: Christopher Byrd, New Milford, CT (US)

(73) Assignee: MICRO FOCUS LLC, Santa Clara, CA (US)

( * ) Notice: Subject to any disclaimer, the term of this patent is extended or adjusted under 35 U.S.C. 154(b) by 31 days.

(21) Appl. No.: 16/070,676

(22) PCT Filed: Jan. 27, 2016

(86) PCT No.: PCT/US2016/015156
§ 371 (c)(1),
(2) Date: Jul. 17, 2018

(87) PCT Pub. No.: WO2017/131669
PCT Pub. Date: Aug. 3, 2017

(65) Prior Publication Data
US 2019/0026108 A1    Jan. 24, 2019

(51) Int. Cl.
*G06F 9/44*     (2018.01)
*G06F 8/75*     (2018.01)
*G06F 11/30*    (2006.01)
*G06F 8/77*     (2018.01)
*G06F 11/36*    (2006.01)

(52) U.S. Cl.
CPC ............ *G06F 8/75* (2013.01); *G06F 8/77* (2013.01); *G06F 9/44* (2013.01); *G06F 11/30* (2013.01); *G06F 11/3608* (2013.01); *G06F 11/3612* (2013.01)

(58) Field of Classification Search
CPC .......... G06F 8/75; G06F 8/77; G06F 11/3608; G06F 11/3612
See application file for complete search history.

(56) References Cited

U.S. PATENT DOCUMENTS

| 8,387,001 | B2 | 2/2013 | Sindhgatta et al. |
| 8,499,284 | B2 | 7/2013 | Pich et al. |
| 8,584,100 | B2 | 11/2013 | Xu et al. |
| 2008/0133435 | A1 | 6/2008 | Chintalapti et al. |
| 2008/0196012 | A1 | 8/2008 | Cohen et al. |

(Continued)

OTHER PUBLICATIONS

Cito, J. et al., "Runtime Metric Meets Developer—Building Better Cloud Applications Using Feedback," (Research Paper), Apr. 15, 2015, 14 pages, available at https://peerj.com/preprints/985.pdf.

(Continued)

*Primary Examiner* — Chat C Do
*Assistant Examiner* — Lenin Paulino (57) ABSTRACT

According to an example, an application code graph of an application may be received and the programming structures of the application may be ranked based on a ranking model. When the information regarding code changes associated with the application are received, the ranking model may be applied to the programming structures associated with the code changes. The impact of the code changes on the application performance may be determined and corresponding recommendations may be produced based on the determined impact.

13 Claims, 6 Drawing Sheets

(56) References Cited

U.S. PATENT DOCUMENTS

| | | | |
|---|---|---|---|
| 2011/0145788 A1* | 6/2011 | Xu .................. | G06F 11/368 |
| | | | 717/121 |
| 2014/0013304 A1 | 1/2014 | Vangala et al. | |
| 2014/0013309 A1* | 1/2014 | Gounares ............ | G06F 11/3664 |
| | | | 717/125 |
| 2014/0123108 A1 | 5/2014 | Cheluvaraju et al. | |
| 2015/0026105 A1* | 1/2015 | Henrichsen ........ | G06Q 30/0273 |
| | | | 706/12 |
| 2015/0089478 A1* | 3/2015 | Cheluvaraju ............ | G06F 8/71 |
| | | | 717/123 |
| 2015/0378863 A1* | 12/2015 | Balachandran ..... | G06F 11/3636 |
| | | | 717/130 |

OTHER PUBLICATIONS

Herskovic, J.R. et al., "MEDrank: Using Graph-based Concept Ranking to Index Biomedical Texts," (Research Paper), Mar. 25, 2011, 12 pages, available at ncbi.nlm.nih.gov/pmc/articles/PMC3090689/.

International Search Report & Written Opinion received in PCT Application No. PCT/US2016/015156, dated Oct. 12, 2016, 13 pages.

Brin, Sergey, et al.; "The anatomy of a large-scale hypertextual Web search engine"; Computer Networks and ISDN Systems 30; 1998; pp. 107-117, 11 pages.

Leskovec, Jure, et al.; "Mining of Massive Datasets", Second Edition (2014), Cambridge University Press, Cambridge CB2 8BS, United Kingdom, pp. 163-200; 39 pages.

* cited by examiner

RECOMMENDATIONS BASED ON THE IMPACT OF CODE CHANGES

BACKGROUND

Computing devices of various shapes and sizes with their multi-tasking functionalities are an indispensable part of modern life. Applications that run on these devices have evolved over time to meet developments in the device hardware. The improvements in the applications involve the development of new modules or the changing of portions of existing applications. When portions of an existing application are updated or changed, the performance of the application is often impacted.

BRIEF DESCRIPTION OF THE DRAWINGS

Features of the present disclosure are illustrated by way of example and not limited in the following figure(s), in which like numerals indicate like elements, and in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

When dealing with applications, and particularly large or complex applications, dependency analysis is often a complex task. For nontrivial multi-tier applications, understanding how classes, packages, transactions, and third party components interact and depend on each other may be difficult to achieve via just an examination of the source code alone. In particular, such dependency analysis may be required in CI/CD (Continuous Integration/Continuous Deployment) environments, where there are frequent code pushes to production, without extensive pre-production QA (Quality Assurance) stages. In addition, there is typically little visibility into a possibility that some code change is unbeknownst an important runtime dependency to a critical code flow, where it may cause regressions or other validation that requires greater testing.

Disclosed herein are systems and methods to analyze the programming structures in the source code of a application based on their respective importance for the performance of the application and provide recommendations if further tests or code review are needed for code changes. If an update to an application involves a programming structure that is critical to the functioning of the application, further testing may be recommended. On the other hand, if the update does not make changes to any critical portions of the application, further testing may not be recommended. An application code graph may be generated in which the programming structures are represented by the nodes while their interactions are modeled as links. The importance of the programming structures may be determined based on the weights assigned to the nodes, in which the weights may be based on their links or via their distance from the top node(s) in the application graph. Thus, the testing and analysis of code changes may be provided with a context based on their importance to the functioning of an application.

Figure 1A:
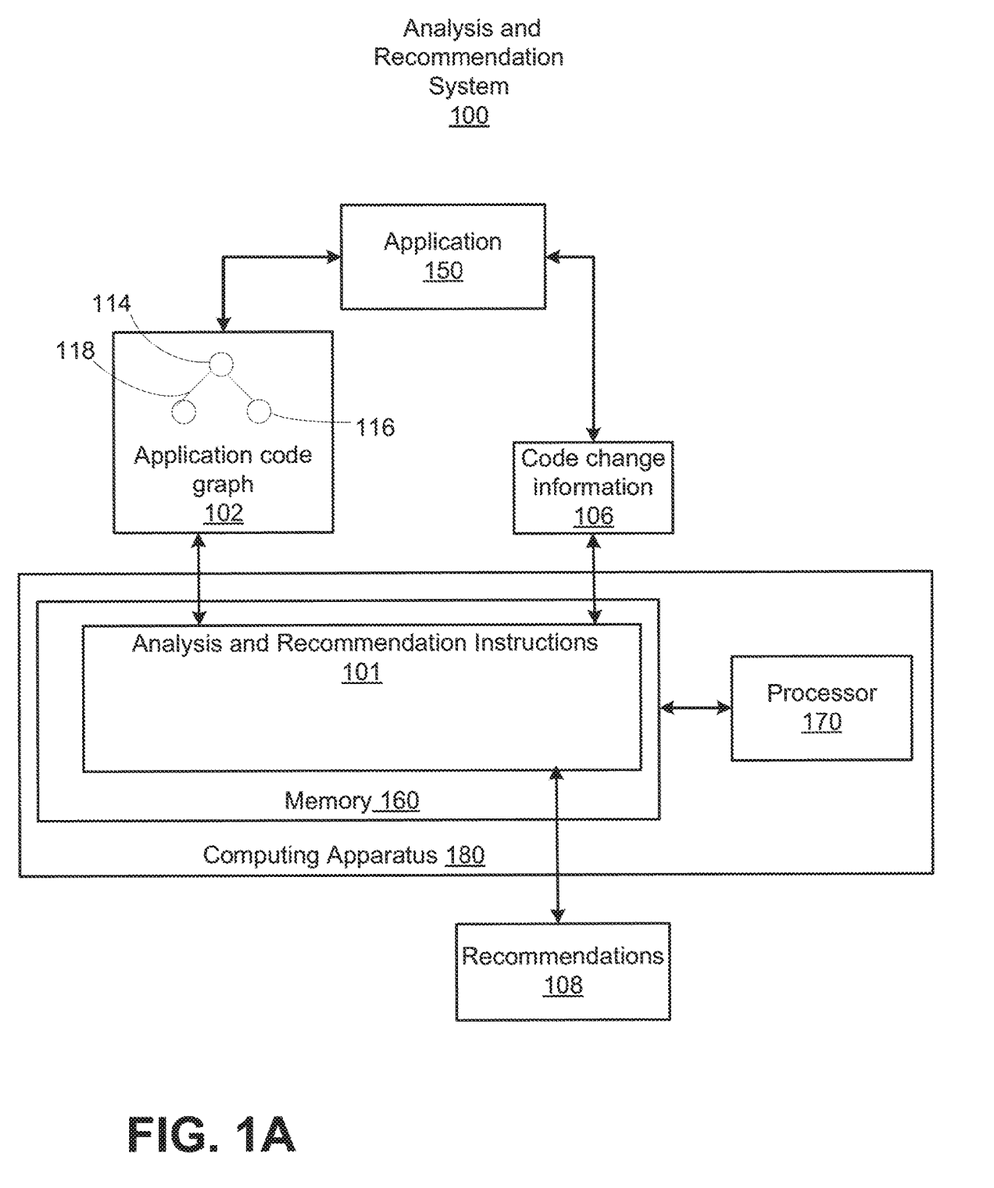
FIG. 1A is a block diagram of an example analysis and recommendation system, which may make use of the present disclosure.

FIG. 1A is a block diagram of an example analysis and recommendation system 100 that may perform link analysis on an application code graph with runtime metrics 102, combined with runtime code discovery in a transactional context. The analysis and recommendation system 100 is depicted as including analysis and recommendation instructions 101 stored in a computer readable medium 160 of a computing apparatus 180. The computing apparatus 180 is also depicted as including a processor 170. The computing apparatus 600 and the computer-readable medium 610 may be operatively coupled to a bus (not shown). For example, the bus may be an EISA, a PCI, a USB, a FireWire, a NuBus, or a PDS. In addition, the computer readable medium 160 may be any suitable non-transitory medium that participates in providing instructions to the processor 170 for execution. For example, the computer readable medium 160 may be non-volatile media, such as an optical or a magnetic disk; volatile media, such as memory. The computer readable medium 160 may also store application control methods, which, when executed may cause the processor 170 to perform some or all of the methods depicted in FIGS. 2-5.

Figure 1B:
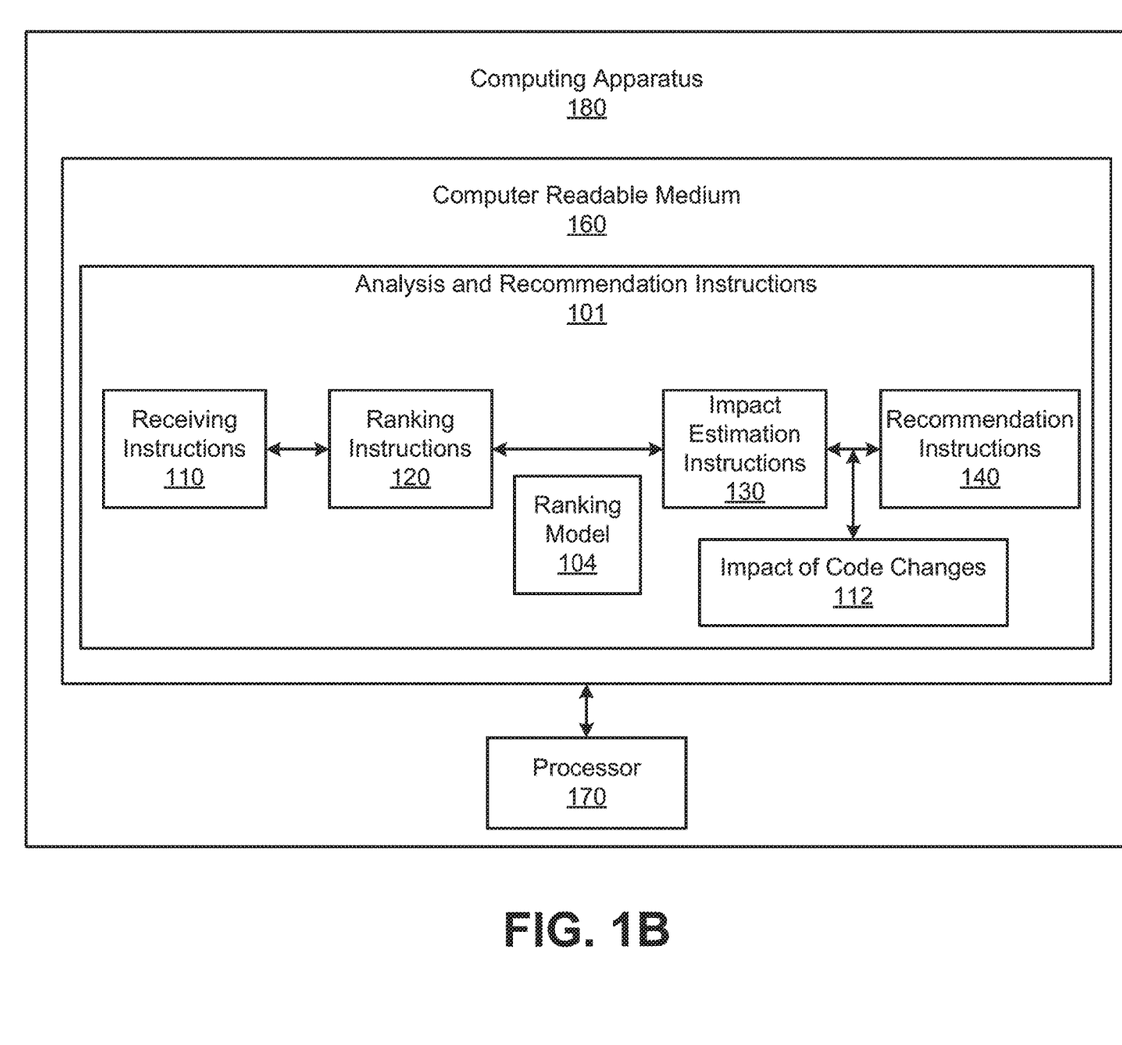
FIG. 1B is a block diagram of an example computing apparatus, which may use features of the present disclosure.

A more detailed depiction of the computing apparatus 180 and the analysis and recommendation instructions 101 is provided in FIG. 1B. The description of the analysis and recommendation system 100 is thus made with reference to both FIGS. 1A and 1B.

The analysis and recommendation instructions 101 may be executed as a stand-alone application or as a part of a larger monitoring system application. Generally speaking, the analysis and recommendation instructions 101 may determine which methods or classes are the most influential or have the most impact for a given application 150. In an example, the application 150 may be executed by a disparate application server (not shown) that may be communicatively coupled to the analysis and recommendation system 100.

A ranking model 104 that ranks the programming structures or code elements based on their impact or influence on a transactional operation of the application 150 may be built. This ranking may be applied to a detected code change of the application 150 to determine the impact and risk that such a code change may bring. For example, those changes in a change set that have the potential to alter the behavior of critical runtime components of the application 150 may be identified. According to an example of the present disclosure, and as discussed herein, the changes to the source code of the application 150 that have performance implications may be analyzed. In addition, the impact that the changes to the source code may have on jars (Java Archives), methods, and/or third party libraries may be analyzed/predicted before the change to the source code is actually deployed to production. Alternatively, the impact may be analyzed/predicted after the change to the source code is deployed to production.

Following deployment of the change to the source code, and in response to the change set including one of the top ranked, i.e., important methods, either unexpectedly or not, the analysis and recommendation instructions 101 may recognize an actionable item and the application owner may be notified that additional regression testing and validation may be recommended to ensure better than normal test coverage. In addition or alternatively, in response to performance or availability problems starting to occur subsequent to the deployment of the change, the changes in the change set may be ranked by those that have the highest likelihood of having introduced some regression/problem based on their importance.

Prior to deployment of the change to the source code, the ranking mod& 104 may be combined with the information regarding the change 106 in order to proactively predict the potential runtime impact of the change as will be detailed further infra.

As shown in FIG. 1B, the analysis and recommendation instructions 101 may include receiving instructions 110, ranking instructions 120, impact instructions 130, and recommendation instructions. The processor 170 may execute the receiving instructions 110 to receive an application code graph 102. The application code graph 102 may be a connected graph 114 that includes nodes 116 connected with edges 118. The nodes 116 may represent methods, classes, objects, libraries or other programming structures that enable functioning of the application, and the edges may represent the metrics associated with such programming structures. By way of illustration and not limitation, an edge between two nodes may represent the volume of data flow between two methods represented by the two nodes. In another example, the edge may represent latency between the two programming structures. The edges may thus represent different performance metrics that may exist between two programming structures. In an example, the application code graph 102 may be generated periodically and updated in a data store accessible to the analysis and recommendation instructions 101.

In one example, the application code graph 102 may be obtained at the runtime of the application 150 based on actual and evolving process flows executed by the application 150. This may permit discovery and prioritization of the set of codes/methods that are actually executing as opposed to the analysis provided by static dependency analysis tools. Generation of the application code graph 102 at runtime may also permit inclusion of the performance characteristics of the code so that different nodes in the application code graph 150 may be assigned different weights based on their performance characteristics. For example, the different weights may be assigned to the nodes based on whether the code flow associated with the nodes in the application code graph 102 has higher volume, has longer computation time, etc.

The processor 170 may execute the ranking instructions 120 to provide the ranking model 104, which ranks the programming structures of the application 150 such as but not limited to, methods, classes and their objects, libraries and the like. For example, the ranking instructions 120 may rank a programming structure based on the position of a node corresponding to the programming structure in the application code graph 102. In an example, the ranking of the node may depend on the distance of the node from the top node(s) in the application code graph 102. The ranking may be further determined by the performance characteristics of the programming structure associated with the node, in which the performance characteristics are represented by the edges arising from and/or terminating on the corresponding node. The details of this procedure will be discussed further infra. The ranking model 104 thus generated may be used to estimate the impact of code changes in the application prior to deployment in one example. In one example, the ranking model 104 may be employed to study the effect of code changes after deployment on the application server. Based on the impact of the code changes, various actionable items may be determined.

Code change information 106 may be change events triggered by alterations to the application code in the case where the code changes are already implemented in the application 150. In an example, the code change information 106 may include prospective code changes that are uploaded to the analysis and recommendation instructions 101. The analysis and recommendation instructions 101 may thus receive code change information 106 either at deployment or prior to deployment. The processor 170 may execute the impact estimation instructions 130 to analyze the code change information 106 in combination with the ranking model 104. In an example, the impact estimation instructions 130 may identify the programming structures included in the code change information 106. The impact estimation instructions 130 may further identify positions of nodes representing the programming structures within the application code graph 102. Based on the relative positions of the nodes, the impact of the code changes 112 included in the code change information 106 may be estimated. In one example, the impact of code changes 112 may also be estimated based on the performance metrics associated with the programming structures referred to in the code change information 106.

The processor 170 may execute the recommendation instructions 140 to receive the impact of code changes 112 and to generate recommendations for additional testing. If the programming structures referred to in the code change information 106 are indicated in the application code graph 102 as being of significant impact in the functioning of the application 150, the processor 170 may execute the recommendation instructions 140 to generate a recommendation 108 that additional testing is required. In an example, the recommendation 108 may identify particular programming structures and code changes for further testing. On the contrary, if the programming structures referred to in the code change information 106 are indicated in the application code graph 102 as having lesser impact on the functioning of the application, no recommendation is generated. In this regard, a recommendation 108 may be generated that further testing is not required. Thus, the performance of the application 150 may be improved by implementing the recommendations 108 thereby providing better end user experience. In an example, the recommendations 108 may be displayed on a display screen (not shown) connected to the computing apparatus 180 or the recommendations 108 may be transmitted to a user device by the computing apparatus 180.

Figure 2:
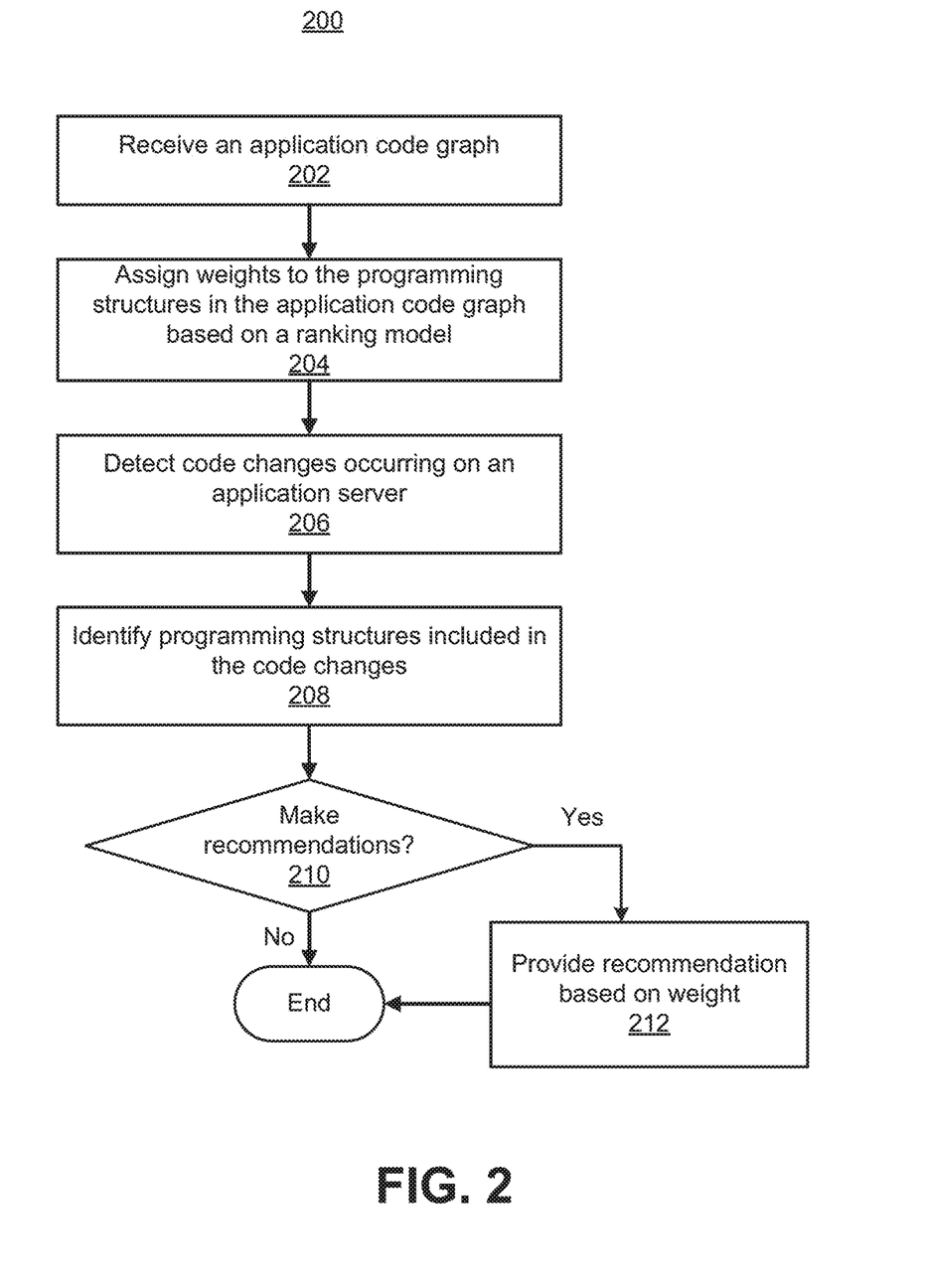
FIG. 2 is a flow chart that details an example method of providing recommendations for improving performance of an application.

FIG. 2 is a flowchart 200 that details an example of a method of providing recommendations for improving performance of an application based on the link analysis of an application code graph 102. The method may begin at block 202, in which an application code graph 102 may be received. In an example, the application code graph 102 may include nodes that represent the various programming structures of an application 150 linked with edges that represent the performance metrics associated with the programming structures. For example, a collection agent, such as but not limited to, HP Diagnostics, which instruments the application server may, as part of normal monitoring, build and report the application code graph 102 including the relationships between any methods invoked in the transactional context at runtime. By aggregating the method graphs across all the transactions, the application code graph 102 may be built. Generally speaking, the application code graph 102 may map the runtime relationships, including flow/performance metrics between the programming structures that are part of the transactional flow of the application server.

At block 204, the programming structures, such as the methods in the application code graph 102, may be analyzed via a link-based ranking model 104, and weights or importances may be assigned to the programming structures included in the application code graph 102. The ranking model 104 may be based on the application of the standard page rank estimation to a connected graph, such as the application code graph 102. An example of a vectorized equation for calculating standard page rank on a graph is shown below:

$$r = \beta M \cdot r + \left[\frac{1-\beta}{N}\right]_N$$

Where:
N is the number of nodes in the graph
r is the page ranking vector, of size N.
β(Beta) is the random walker probability
M is the N×N stochastic transition matrix, capturing the out degree distribution from each node to the other.
[1-Beta/N] is a vector of size N containing the probability of the node to be selected, if a random walk is selected. This may be the teleport probability set (T[N]). In this equation, a uniform distribution across all nodes is used.

Page rank may be calculated by iteration over this equation until r converges. Thus, a connected graph, such as the application code graph 102, which represents performance metrics like volume, response time, latency etc., may be analyzed in a way that provides actionable items while maintaining the PageRank formulation requirement. The requirement being: a stochastic transition matrix with a converging page rank vector.

In one example, the volume along the edges is one of the metrics that may be captured from a performance monitoring perspective. In the application code graph 102 that includes flow metrics, an edge that is called many times is weighted higher than an edge representing a single invocation. For example: an invocation of Method A→Method B which occurs N times, should be more significant than Method A→Method D called only once. At the same time, if a given method makes outbound calls infrequently as compared to its inbound calls, it would be incorrect to assume that the outbound flow equals the inbound flow for the node corresponding to the method. This would cause the importance to be drained away from the method when it should have been given higher importance/weight. In order to model to such flow accurately in the transition matrix, the contribution or weight for the inbound and outbound flow is not evenly distributed. Rather, the weight may be scaled to be proportional to the relative volume, with the additional special case that the volume that ends in the node gets reflected in a self-looping link back to the node. Accordingly:

$$TransitionWeightFromATo[B] = \frac{VolumeFromAToB}{VolumeEndingInNodeA + SumOfVolumeLeavingNodeA} \quad \text{Eq. (1)}$$

$$TransitionWeightFromAToA = \frac{VolumeEndingInNodeA}{VolumeEndingInNodeA + SumOfVolumeLeavingNodeA} \quad \text{Eq. (2)}$$

Similarly, additional edge metrics may be added to this weighting distribution. For example, latency on the edges can also be modeled as part of the transition weights. A generalized transition weighting formula for any number of metrics may be given by the equation below:

$$TransitionWeightFromATo[B] == \quad \text{Eq. (3)}$$

$$\frac{(MetricA_{FromAToB} + MetricB_{FromAToB} + \ldots)}{MetricA_{EndingInNodeA} + MetricA_{SumLeavingNodeA} + MetricB_{EndingInNodeA} + MetricB_{EndingInNodeA} + \ldots}$$

In the above equations, the resulting weights across all the outbound edges always add to 1, as one must maintain a stochastic transition matrix (column vector sums to 1) in order for PageRank to converge properly.

In one example, the relative frequency and total response time may also be modeled via the nodes of the application code graph 102. Given a set of nodes N1, N2, N3, if N3 experiences five times the volume as compared to N1 and N2, N3 may be modeled as being more important and a change occurring to N3 provides higher impact on the overall functioning of the application as compared to changes occurring at N1 or N2. Similarly, programming structures that are important may be those programming structures that are doing the actual work within the application. For example, given a chain of methods that call each other, if a parent method's total time spent is completely contained within a child method's work, the parent has no time where it is actually doing any work. In this case, the parent method may be assigned less importance since the parent method merely executes a pass through to the child method where the actual work is done. Hence, in an example, exclusive latency is used as a measure of weight rather than the absolute total time of a method. The exclusive latency time generally refers to the time spent in the target method, excluding time spent calling child methods. Between two nodes of equal volume, exclusive latency therefore may be indicative of the method that should be assigned greater importance or weight. A combination of metrics may thus be used to assign importance to the programming structures within the application 150.

The analysis as described herein may implement a topic sensitive or personalized page rank that uses the notion of biasing the teleport set ([1-Beta/N]) to direct the random walker to a subset of nodes, rather than uniformly across all nodes, thereby increasing the impact of nodes that are more important to the functioning of the application 150. This approach may take into account any performance metrics that may be present on the nodes. The total volume through a node may be given a higher probability (according to how heavy the volume is, across the entire application 150) of attracting a random walker when the walker jumps. And the more internal logic being executed within the node further increases the probability that more importance is given to it as a destination for random walks.

In one example, a ranking formula based on the performance metrics on a node is used. The performance ranking may be developed based on the following model:

The total volume through each node, and the total exclusive latency spent by each node are normalized across the entire application.

Nodes that exceed a certain weight threshold are added to a candidate teleport set with a walker probability equal to a weighted combination of normalized volume and normalized exclusive latency.

When multiple metrics are applied, the contribution of those metrics can be optionally weighted differently based on their relevance. For example, it may be desired to have a volume contribute 75% of it's normalized value, while latency as a less dominant indicator should contribute 25% of it's value to the probability.

The teleport vector T[N] equation for two metrics then becomes:

$$Weight[N] = (\alpha * MetricAatNode[n]_{normalized} + (1 - \alpha)MetricBatNode[n]_{normalized}) \quad \text{Eq. (4)}$$

$$\text{if } Weight[n] < \text{threshold}; \, Weight[n] = 0$$

$$T_{[N]} = \frac{(1 - \beta)}{SumOfAllWeights} \times Weight[N] \quad \text{Eq. (5)}$$

where α is the contribution weight between Metric A and Metric B (α=0.75 in the example). The ranking model 104 is thus created which provides the importance of each node (or method) in the application code graph 102.

Subsequently, at block 206, the code changes occurring on the application server may be automatically detected. Again, a collection agent may also automatically detect changes in code and deployment occurring on the application server. The changes may include changing third party libraries, jar files and the like. This creates a change set of classes that have undergone some change as part of a deployment event. Generally, in lieu of an automatically detected change event, a change event detected from any source may be accepted as input to the analysis and recommendation instructions 101. Such a change event may come from a build/CI system, a human directly inputting some change to analyze or other programmatic notifications of a change. In one example, a developer may upload a prospective code change that is to be implemented on the application 150 in order to determine its consequences or impact prior to its implementation. In this case, the developer may manually trigger the code change event.

At block 208, the programming structures included in the code changes may be identified. Various programming structures, such as but not limited to methods, classes, objects, jar files and the like referred to in the code change information 106 may be detected at block 208. At block 210, based on the importance assigned to the programming structures in the application code graph 102, it is determined if any recommendations are to be made. If the programming structures are analyzed as being less important and hence assigned less weight, the process can terminate on the end block without further recommendations. In another example, the recommendations 108 may suggest that no further testing is needed if the methods in the application code graph 102 are analyzed as being less important to the functioning of the application 150. If it is determined at 210 that the weight of the programming structures subjected to the code change indicates that the programming structures are sufficiently important to warrant further scrutiny, various recommendations 108 can be made at 212. The recommendations may include suggestions for further testing if the methods included in the code change information are estimated as being important. In an example, the recommendations may also indicate in detail the programming structures or particular code changes that need further testing or scrutiny.

The examples as described herein may enable improvements in different technical fields where applications are used. This is because a brief perusal of the application code graph is generally insufficient to determine the complex dependencies between the various programming structures within an application. Therefore, determining the impact of code changes in accordance with examples discussed herein can provide an insight into the consequences of a particular update. If the code changes are submitted in advance to the analysis and recommendation instructions 101, then such consequences may be detected even prior to rolling out the updates. This may result in an overall improvement in the performance of the application as well as the functioning of the computing devices that execute the application.

Figure 3:
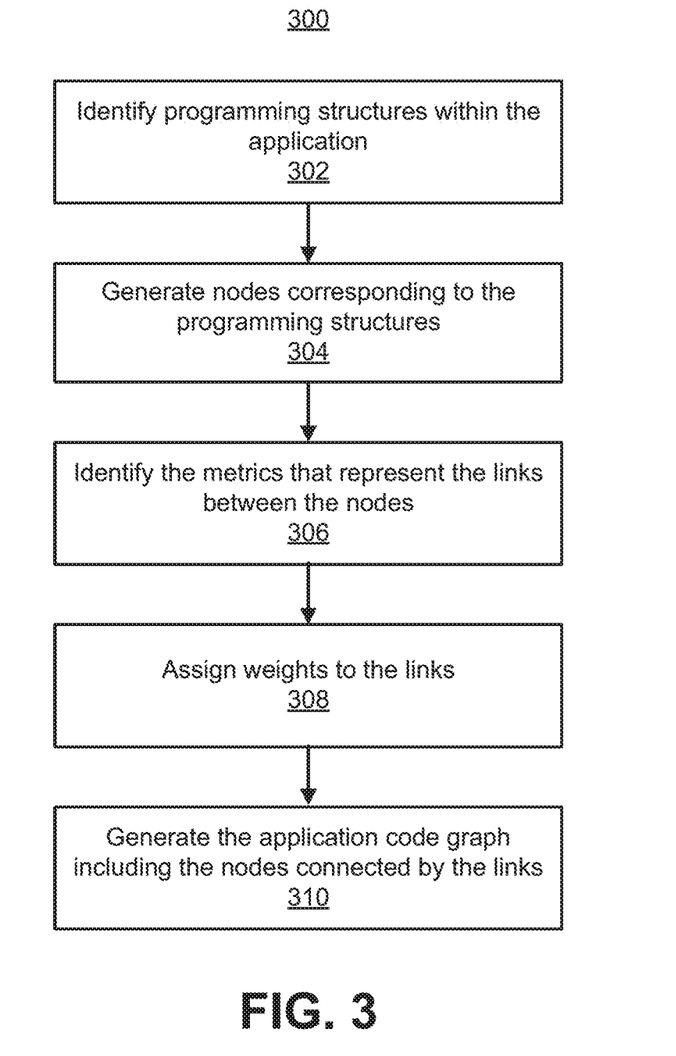
FIG. 3 shows a flowchart that details an example method of generating an application code graph.

FIG. 3 shows a flowchart 300 that details an example of a method of generating the application code graph 102. An application code graph 102 generated by any machine learning techniques that currently exist or which are to be invented may be used for generating the recommendations as described herein. The method may begin at block 302, in which various programming structures within the application 150 may be identified. The programming structures may include but are not limited to methods, classes, objects, and the like. The nodes of the application code graph 102 corresponding to the identified programming structures may be generated at block 304. At block 306, the various metrics to be modeled as the links between the nodes may be identified. One or more metrics such as but not limited to volume, response time, latency, and the like, may be modeled as links between the nodes. Weights may be assigned to the links at block 308 based on the metrics at identified at block 306 as described herein. For example, a node that represents a method that makes more outbound calls than receives inbound calls from other methods will have its links weighed accordingly. In one example, multiple metrics may be used with their weights being considered in proportion to their relevance. The application code graph 102 that represents the programming structures connected by the links may be generated at block 310. In one example, the application code graph 102 may be generated at runtime for including flow/performance metrics between the programming structures.

Figure 4:
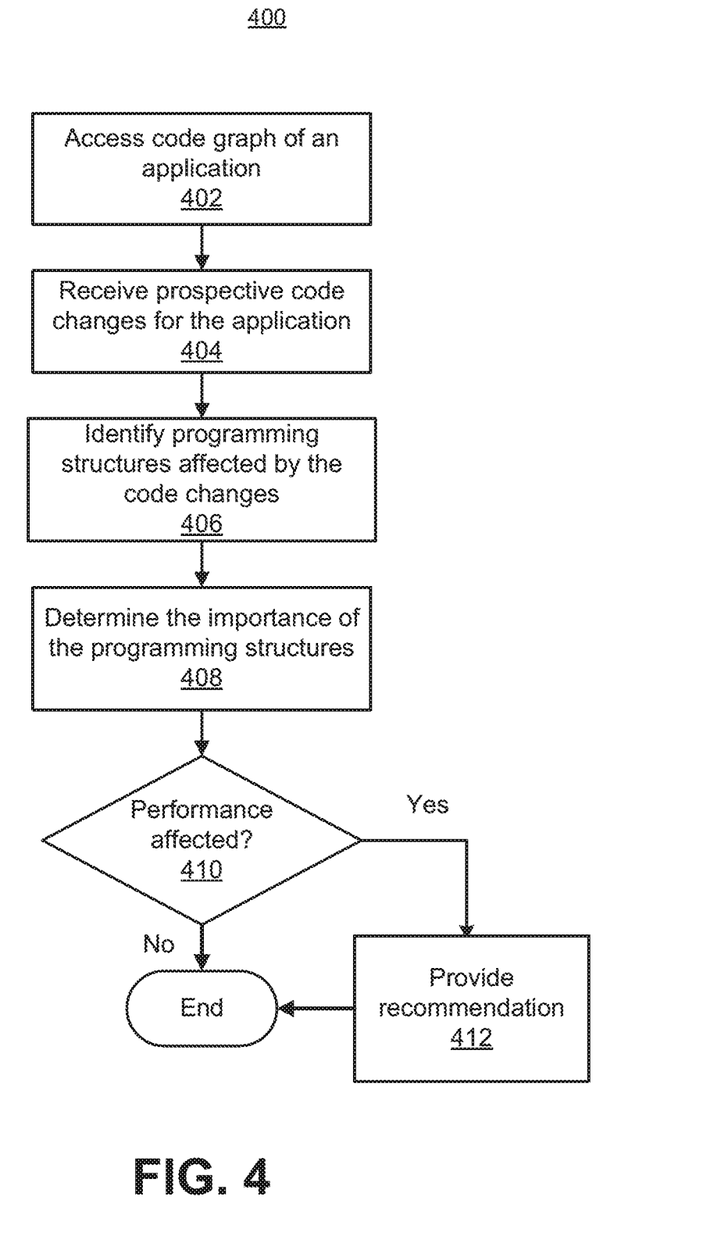
FIG. 4 is a flowchart that details an example method of analyzing the impact of a code change(s)

FIG. 4 is a flowchart 400 that details one example of a method of analyzing the impact of a prospective code change(s) in accordance with one example. The method may begin at block 402, in which a code graph of the application associated with the code change(s) may be accessed. At block 404, prospective code change(s) may be received. In an example, the code change(s) may be input to the analysis and recommendation instructions 101 prior to the code change(s) being executed on the application 150. At block 406, the methods, libraries, classes or other programming structures affected by the prospective code change(s) may be identified. The importance of the programming structures affected by the prospective code change(s) may be obtained at block 408 as described herein. In one example, the importance may be determined based on an intersection of programming structures between the application code graph and the prospective code change(s). The position of the programming structures within the application code graph may be indicative of their importance for the functioning of the application. In an example, weights assigned to the nodes corresponding to the programming structures in the prospective code change(s) may be used to determine their importance.

Based on the importance determination from block 408, it can be determined at block 410 whether the prospective code change(s) will affect the application performance significantly. In an example, the importance of the application as determined at block 408 may be compared to a predetermined number in order to determine if the programming structure is sufficiently important for generating a recommendation. If it is determined at block 410 that the programming structures are sufficiently important and the code change(s) significantly affect application performance, further testing of the code changes is recommended at block 412. If it is determined at 410 that the programming structures are not important and the code change(s) do not significantly affect application performance, it can be recommended at block 412 that further testing of the code changes is not required. Alternately, no recommendation may be generated at 412 for unimportant programming structures. In one example, the recommendation may identify the particular programming structures or code changes that warrant further testing or scrutiny.

Figure 5:
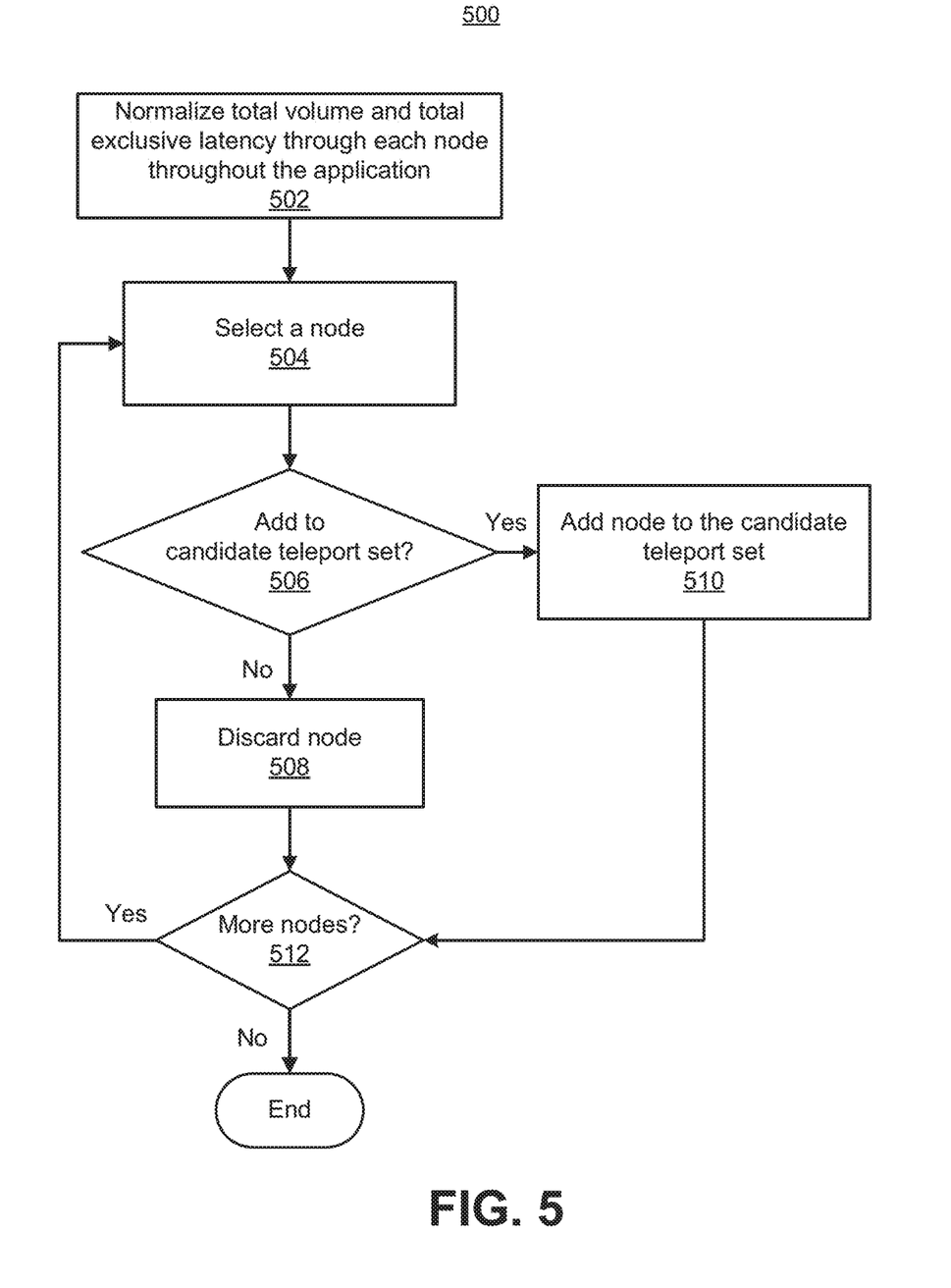
FIG. 5 is a flowchart that details an example method of obtaining a ranking formula based on the performance metrics of a node.

FIG. 5 is a flowchart 500 that details an example of a method of obtaining a ranking formula based on the performance metrics. It may be appreciated that the processing of the nodes is shown serially only for illustration and that some or all of the nodes may be processed simultaneously in parallel for obtaining the ranking. The method may begin at block 502, in which the total volume through each node, and the total exclusive latency spent by a node in the application code graph 102 may be normalized across the entire application. At block 504, a first node among a plurality of nodes in the application code graph 102 may be selected. At block 506, a determination may be made as to whether a node exceeds a predetermined threshold weight in order to be added to a candidate teleport set with a walker probability equal to a weighted combination of normalized volume and normalized exclusive latency. If the node does not exceed the predetermined weight, the node may be discarded at block 508 and a determination may be made at block 512 as to whether more nodes exist for processing. If yes, the method may return to block 504 to select the next node, else the method may terminate on the end block. If at block 506, it is determined that the node exceeds the weight threshold, the node may be added at block 510 to the candidate teleport set with a walker probability equal to a weighted combination of normalized volume and normalized exclusive latency and the method may proceed to block 512 to determine if further nodes exist for processing.

Some or all of the operations set forth in the methods depicted in FIGS. 2-5 may be contained as utilities, programs, or subprograms, in any desired computer accessible medium. In addition, the methods may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims, and their equivalents, in which all terms are meant in their broadest reasonable sense unless otherwise indicated.

What is claimed is:

1. A computing apparatus comprising:
a processor;
a non-transitory computer readable medium to store instructions that, when executed by the processor, cause the processor to:
receive an application code graph that comprises information regarding programming structures executed by an application, wherein the application code graph is a connected graph comprising nodes representing the programming structures and edges representing values of a performance metric linking the nodes;
generate a ranking model based on the values, wherein the ranking model comprises a stochastic transition matrix representing transitions among the nodes and ranks the programming structures from the application code graph;
receive information regarding a code change associated with the application;
combine the ranking model with the information regarding the code change;
obtain an impact of the code change on a performance of the application;
produce recommendations associated with the impact of the code change based on the combination of the ranking model with the information regarding the code change;
assign a weight to a given node of the nodes based on a direction and a magnitude associated with a value of the values linking the given node to another node of the-nodes; and
test the code change based on the recommendations if the code change impacts the performance of the application.

2. The computing apparatus of claim 1, the non-transitory computer readable medium further comprising instructions that cause the processor to:
generate the application code graph at runtime, wherein the performance metric comprises one of volume and response time.

3. The computing apparatus of claim 1, wherein the recommendations identify particular programming structures and code changes for further testing.

4. The computing apparatus of claim 1, wherein the instructions, when executed by the processor, further cause the processor to perform multiple iterations to determine a converging page rank vector representing a ranking of the programming structures.

5. The computing apparatus of claim 1, wherein the edges represent values of a plurality of performance metrics.

6. The computing apparatus of claim 5, wherein a contribution of each of the plurality of performance metrics is weighted based on respective relevance.

7. A method, comprising:
    accessing, by a processor, a code graph of an application associated with a prospective code change, wherein the code graph comprises information regarding a plurality of programming structures executed by the application, and the code graph comprises a connected graph comprising nodes representing the plurality of programming structures and edges representing values of a performance metric linking the nodes;
    receiving, by the processor, information regarding the prospective code change to be applied to the application;
    identifying, by the processor, programming structures of the plurality of programming structures to be affected by the prospective code change;
    assigning, by the processor, importance to the identified programming structures based on the code graph, wherein assigning importance comprises generating a ranking model based on a stochastic transition matrix representing transitions among the nodes, wherein the ranking model ranks the plurality of programming structures;
    generating, by the processor, recommendations for further testing based on the importance of the identified programming structures comprised in the information;
    assigning, by the processor, a weight to a given node of the nodes based on a direction and a magnitude associated with a value of the values linking the given node to another node of the-nodes; and
    testing, by the processor, the prospective code change based on the recommendations if the prospective code change impacts a performance of the application.

8. The method of claim 7, wherein generating the ranking model comprises performing multiple iterations to converge a page rank vector representing the ranking of the plurality of programming structures.

9. The method of claim 7, further comprising weighting the performance metric based on relevance.

10. The method of claim 7, wherein assigning importance to the identified programming structures further comprises:
    assigning, by the processor, weights to the nodes, wherein the weights are proportional to a relative volume and wherein the performance metric is the relative volume between the nodes;
    comparing, by the processor, the weights assigned to the nodes to a predetermined threshold;
    determining, by the processor, one of the plurality of programming structures associated with a particular node of the nodes to be important in response to the weight assigned to the particular node exceeding the predetermined threshold; and
    recommending, by the processor, further testing in response to the programming structure associated with the particular node being determined to be important.

11. A non-transitory computer readable storage medium comprising machine readable instructions that, when executed by a processor, cause the processor to:
    detect a code change implemented on an application;
    retrieve an application code graph that comprises nodes representing programming structures of the application linked by values of a performance metric;
    identify the programming structures affected by the code change;
    determine weights associated with the programming structures, wherein the weights are indicative of an effect of the code change on a performance of the application, wherein determining the respective weights comprises generating a ranking model based on a stochastic transition matrix, and the ranking model analyzes the values of the performance metric and ranks the programming structures;
    provide a recommendation based on the weights associated with the programming structures;
    assign a weight of the weights to a given node of the nodes based on a direction and a magnitude associated with a value of the values linking the given node to another node of the-nodes; and
    test the code change based on the recommendation if the code change impacts the performance of the application.

12. The non-transitory computer readable storage medium of claim 11, wherein the performance metric comprises at least one of volume, response time, and latency.

13. The non-transitory computer readable storage medium of claim 11, wherein the instructions, when executed by the processor, further cause the processor to:
    provide a converging page rank vector representing the ranking of the programming structures.

* * * * *